(12) United States Patent
Grose et al.

(10) Patent No.: US 9,454,738 B1
(45) Date of Patent: Sep. 27, 2016

(54) METHODS AND SYSTEMS FOR CORRESPONDENCE PATTERN AUTOMATION OF SCALABLE FEED FORWARD PROCESSES

(75) Inventors: David Lee Grose, Poulsbo, WA (US); Thomas E. Sherer, Everett, WA (US); Scott D. Button, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 978 days.

(21) Appl. No.: 12/872,746

(22) Filed: Aug. 31, 2010

(51) Int. Cl.
 *G06F 19/00* (2011.01)
 *G06Q 10/06* (2012.01)

(52) U.S. Cl.
 CPC .................................... *G06Q 10/06* (2013.01)

(58) Field of Classification Search
 CPC ........................................................ G06Q 10/06
 USPC ........................................................... 700/97
 See application file for complete search history.

(56) References Cited

U.S. PATENT DOCUMENTS

| | | | |
|---|---|---|---|
| 5,231,585 A * | 7/1993 | Kobayashi | G06Q 10/06 700/112 |
| 5,461,699 A | 10/1995 | Arbabi et al. | |
| 5,806,056 A | 9/1998 | Hekmatpour | |
| 6,141,776 A | 10/2000 | Grose et al. | |
| 6,154,213 A | 11/2000 | Rennison et al. | |
| 6,220,743 B1 | 4/2001 | Campestre et al. | |
| 6,292,830 B1 | 9/2001 | Taylor et al. | |
| 6,778,863 B1 | 8/2004 | Lienhard et al. | |
| 6,877,153 B2 | 4/2005 | Konnersman | |
| 7,250,944 B2 | 7/2007 | Anderson et al. | |
| 7,373,612 B2 | 5/2008 | Risch et al. | |
| 7,460,984 B1 | 12/2008 | Clark et al. | |
| 7,542,892 B1 | 6/2009 | Clark et al. | |
| 7,873,920 B2 | 1/2011 | Grose | |
| 7,899,768 B2 | 3/2011 | Grose | |
| 2001/0032029 A1 | 10/2001 | Kauffman | |
| 2002/0054117 A1 | 5/2002 | van Dantzich et al. | |
| 2003/0014379 A1 | 1/2003 | Saias et al. | |
| 2004/0088577 A1 | 5/2004 | Render | |
| 2004/0090472 A1 | 5/2004 | Risch et al. | |
| 2005/0076313 A1 | 4/2005 | Pegram et al. | |
| 2005/0096950 A1 | 5/2005 | Calpan et al. | |
| 2005/0180330 A1 | 8/2005 | Shapiro | |

(Continued)

OTHER PUBLICATIONS

Varro et al., "Incremental Graph Pattern Matching: Data Structures and Initial Experiments", 2006, In Graph and Model Transformation (GraMoT), vol. 4 of Electronic Communications of the EASST, 14 pages.

(Continued)

*Primary Examiner* — Kimberly Wilson
(74) *Attorney, Agent, or Firm* — Patterson + Sheridan, LLP

(57) ABSTRACT

Technologies are described herein for automating a selection of data inputs. Some technologies are adapted to select a product that is a component part of a segment. The technologies select an external product that is utilized for production of the segment and an external component of the external product. If the name of the external component matches a name of the product, then the technologies add the external component as an external input to the product. The technologies also select an internal product that is utilized for the production of the segment and an internal component of the internal product. If the name of the internal component matches the name of the product, then the technologies add the internal component as an internal input to the product.

19 Claims, 10 Drawing Sheets

(56) References Cited

U.S. PATENT DOCUMENTS

| | | | |
|---|---|---|---|
| 2005/0197875 A1 | 9/2005 | Kauffman | |
| 2006/0235658 A1 | 10/2006 | Nitta et al. | |
| 2008/0109475 A1 | 5/2008 | Burmester et al. | |
| 2008/0205280 A1 | 8/2008 | Saphir | |
| 2008/0319719 A1 | 12/2008 | Grose et al. | |
| 2009/0006293 A1* | 1/2009 | Grose et al. | 706/20 |
| 2012/0050287 A1 | 3/2012 | Grose et al. | |

OTHER PUBLICATIONS

Trochim, W., "Pattern Matching for Construct Validity", web page last revised Oct. 20, 2006, retrieved Aug. 16, 2010 from http://www.socialresearchmethods.net/kb/pmconval.php, 5 pages.

*Syntatic and Structural Pattern Recognition: Theory and Applications.* 1990. Eds. Horst Bunke and Alberto Sanfeliu, World Scientific, New Jersey, (viiii, 554 pp.); 5 pages.

"2.3.11 Repeated Patterns" retrieved Aug. 27, 2010 from http://reference.wolfram.com/legacy/v5_2/book/section-2.3.11, 2 pages.

U.S. Office Action dated Feb. 25, 2010 in U.S. Appl. No. 11/771,380.

U.S. Office Action dated Jun. 7, 2010 in U.S. Appl. No. 11/771,380.

U.S. Notice of Allowance dated Nov. 3, 2010 in U.S. Appl. No. 11/771,380.

U.S. Office Action dated Mar. 30, 2010 in U.S. Appl. No. 11/768,098.

U.S. Notice of Allowance dated Sep. 24, 2010 in U.S. Appl. No. 11/768,098.

Zhang, "Forecasting with Artificial Neural Networks the State of the Art," Jul. 31, 1997, International Journal of Forecasting Elsevier Science B.V., pp. 35-63.

Wikipedia, "Force-Based Algorithms", web page last modified on Aug. 20, 2010, retrieved Aug. 30, 2010 from Wikipedia entry on force-based algorithms, 4 pages.

International Search Report & Written Opinion dated Sep. 7, 2012 in PCT Application No. PCT/US11/45979.

U.S. Office Action dated Mar. 14, 2013 in U.S. Appl. No. 12/872,800.

U.S. Notice of Allowance dated Jul. 31, 2013 in U.S. Appl. No. 12/872,800.

Paananen, Jussi et al., "FORG3D: Force-Directed 3D Graph Editor for Visualization of Integrated Genome Scale Data," BMC Systems Biology, BioMed Central Ltd., LO, vol. 3, No. 1, Feb. 24, 2009.

* cited by examiner

METHODS AND SYSTEMS FOR CORRESPONDENCE PATTERN AUTOMATION OF SCALABLE FEED FORWARD PROCESSES

CROSS-REFERENCE TO RELATED APPLICATIONS

This application is related to U.S. patent application Ser. No. 11/771,380, filed on Jun. 29, 2007, entitled "Methods and Systems for Scalable Hierarchical Feed-Forward Processes," U.S. patent application Ser. No. 11/768,098, filed on Jun. 25, 2007, entitled "Methods and Systems for Displaying Network Information," and U.S. patent application Ser. No. 12/872,800, filed concurrently, entitled "Three-Dimensional Display of Specifications in a Scalable Feed Forward Network," which are hereby incorporated by reference in their entirety.

BACKGROUND

Manually developing a complex process for producing a product, such as a commercial aircraft, can be difficult and expensive. Generally, the complex process can be broken down into a hierarchy of individual processes, which generate portions of the product. In the hierarchy, results from lower-level individual processes may aggregate into higher-level individual processes. The highest-level individual processes may eventually produce the completed product.

Some approaches to developing the complex process may involve generating a schedule for completing the individual processes. However, the schedule may not account for relationships between the individual processes. In particular, problems can arise when one or more individual processes are unfinished. For example, a higher-level process may receive input from five lower-level processes. The schedule may underestimate the amount time needed to complete two of the five lower-level processes. As a result, the higher-level process may receive three complete results and two incomplete results from the five lower-level processes. These incomplete results may cause errors in the completion of the higher-level process, which may then be passed onto further higher-level processes that create additional errors.

These errors may be detected at a later time during the production of the product. In order to resolve these errors, the schedule may be postponed and the incomplete individual processes may be repeated. This process of repeating the incomplete individual processes may be referred to as "out of sequence rework." Such out of sequence rework can significantly increase the amount of time and expense to produce the product.

It is with respect to these and other considerations that the disclosure made herein is presented.

SUMMARY

Technologies are described herein for automating the selection of data inputs. A product can be described in terms of its component breakdown. Data input patterns within the component breakdown can be replicated when creating a process adapted to create the product.

In order to automate the selection of data inputs, some technologies are adapted to select a product that is a component part of a segment. The technologies select an external product that is utilized for production of the segment and an external component of the external product. If the name of the external component matches a name of the product, then the technologies add the external component as an external input to the product. The technologies also select an internal product that is utilized for the production of the segment and an internal component of the internal product. If the name of the internal component matches the name of the product, then the technologies add the internal component as an internal input to the product.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
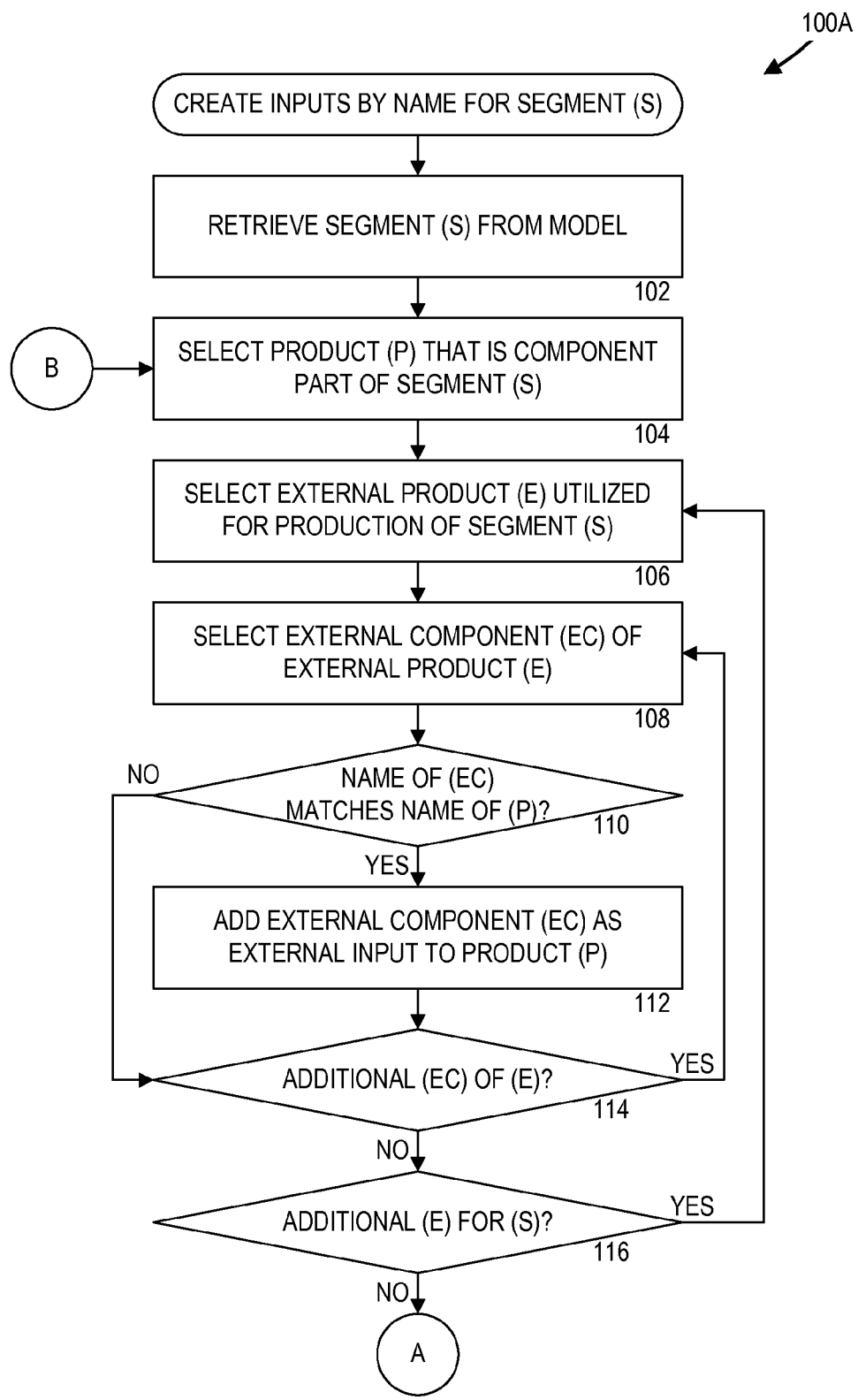
FIGS. 1A-1B are flow diagrams illustrating an example method for creating inputs by name for a segment, in accordance with some embodiments.

The following detailed description is directed to technologies for automating a selection of data inputs for constructing scalable feed forward processes. The modeling of large complex processes, such as an aircraft product development process, may involve many relationships between process components. For such complex processes, scale and complexity may reach a threshold where it becomes impractical to manually establish each of these relationships.

Some of the process components may include repeated recursive patterns of relationships. By observing these repeated recursive patterns of relationships, embodiments described herein may utilize the observed patterns to automate the selection of data inputs for constructing scalable feed forward processes. The embodiments described herein can be differentiated from conventional approaches as these embodiments may utilize inspection of similar content to facilitate the replication of relationship patterns recursively through a hierarchy of a feed-forward network.

In an example, an aircraft product development process may include a process component called "external loads." A current or previous design cycle of the aircraft product development process may define a pattern of information inputs for "external loads." Embodiments described herein may observe these patterns of information inputs in various design cycles (e.g., conceptual design, preliminary design, detail design, etc.) of the aircraft product development process and replicate these patterns of information inputs for other "external loads" in a current design cycle of the aircraft product development process.

In another example, an aircraft product development process may involve the fabrication of parts of a subassembly. The processes for fabricating each part may utilize the following information inputs: detailed design, production tooling, production facility, detail manufacturing plan, and raw materials. Regardless of the particular part, these information inputs may be utilized in the process for fabricating the part. Embodiments described herein may be adapted to provide the automatic selection of these information inputs for each part according to the observed pattern of information inputs.

A product, including physical products (e.g., objects) and non-physical products (e.g., information), may be described in terms of a hierarchical breakdown (hereinafter referred to as a "hierarchy") of the product's components. A process may be adapted to describe the construction of the product by defining tasks and precedences associated with the creation of each component. For example, the precedences may indicate that a particular task should be completed before another task is performed. Example technologies for constructing the process are described in the above-referenced and incorporated U.S. Patent Application entitled "Methods and Systems for Scalable Hierarchical Feed-Forward Processes." The process may be embodied in a process model, such as the process model 520 illustrated in FIG. 5. The process model may be adapted to maintain a feed-forward constraint such that no cycles or loops are contained within the process model. The process may also be scalable such that the process may be combined with other processes to generate a larger process.

As used herein, a "product" may refer to something input into or produced by a process in the process model. An illustrative process may be a commercial aircraft development process. In one example, a product of the commercial aircraft development process may include an aircraft or a part of the aircraft (e.g., fuselage section, wing, landing gear, engine, etc.). In another example, the product may include a type certificate or other relevant document related to legal use of the aircraft. In yet another example, the product may include a design specification or other dataset related to the design and/or construction of the aircraft. Some other examples of products may include a wing center section, a control column and wheel, an overhead stowage bin, a layout of passenger arrangement, front spar interface loads, and pitching moment curves.

The product may be either an "internal product" or an "external product." The internal product may be produced by a process in the process model. The internal product may receive as input an external product and an internal product. Some examples of internal products in the commercial aircraft development process may include avionics, propulsion systems, and engine specific fuel consumption curves. Each internal product may include multiple "internal inputs," which may be utilized or needed to produce the internal product.

The internal inputs may include "internal components" and "component inputs." The internal components may refer to a subset of non-external inputs that is not part of the same aggregation as the internal product. The component inputs may refer to a subset of non-external inputs that is part of the same aggregation as the internal product. An illustrative internal product may be a subassembly. For the subassembly, an example component input may be parts of the subassembly, and an example internal component may be a tool that assembles the parts to produce the subassembly. In this case, the parts form the subassembly. As such, the parts are considered in the same aggregation as the subassembly. In contrast, the tool that assembles the parts is not included within the subassembly. As such, the tool is considered as not part of the same aggregation as the subassembly.

The external product may be produced outside of a process in the process model. In contrast to the internal product, the external product may not receive an input. Some examples of external products in the commercial aircraft development process may include regulatory requirements, customer requirements, company ground rules, and existing facilities. The external product may include multiple components, the aggregate of which forms the external product. Each such component forming the external product may be referred to herein as an "external component." The internal products, the external products, the internal components, the component inputs, and/or the external components may form the set of inputs into a process adapted to produce any given internal product.

Each internal product may be a "segment" or a "component." As used herein, a segment may refer to a highest aggregation of a product in the hierarchy. The hierarchy may include one or more segments, each corresponding to a different product. In the commercial aircraft development process, some examples of segments may include technology assessment, exploratory design, conceptual design, preliminary design, production system, infrastructure, detail manufacturing plans, vehicle product, and product validation.

As used herein, a component may refer to any lower level (i.e., a component level) of the hierarchy below the segment level. That is, in the hierarchy, the segment may branch down into a component, which may branch down into additional components. For the example segment "infrastructure" in the commercial aircraft development process, an example component may include "production facilities," which further includes the component "major assemblies." The component "major assemblies" may include the component "wing center section," which further includes the component "upper panel."

A product may also be described as a "source product" or a "target product." A source product may refer to a product that is utilized as an origin for a copy operation. The source product may include multiple components, the aggregate of which forms the source product. Each such component forming the source product may be referred to herein as a "source component." A target product may refer to a product that is utilized as a destination for the copy operation. The target product may include components, the aggregate of which forms the target product. Each such component forming the target product may be referred to herein as a "target component."

As used herein, an "input" may refer to a product, such as an internal product or an external product, that is utilized or required to produce another product. That is, a statement that a first product is input to second product may refer to the utilization or requirement of the first product to produce the second product. For example, an internal product may be a design specification of an airplane wing. An external product may be specifications of fasteners that are utilized or required in the production of the detailed design. In this case, since the design specification of the airplane wing utilizes or requires the specifications of fasteners, the specifications of fasteners may also be referred to as an external input to the design specification of the airplane wing. According to some embodiments, an internal product can receive an input, but an external product cannot receive an input.

Some embodiments described herein can be utilized to reduce effort in modeling processes. Such embodiments may be applicable for large scale, complex product development. Some example applications may include, but are not limited to, aerospace, automotive, system of systems, ship building, and large scale construction projects (e.g., power plants, mass transit, utility power distribution, etc.).

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, in which like numerals represent like elements through the several figures, various methodologies for automating a selection of data inputs in the construction of a scalable feed forward process will be described. In particular, FIGS. 1A-1B, 2A-2C, 3A-3B, and 4A-4B are flow diagrams illustrating some example methods 100A-100B, 200A-200C, 300A-300B, and 400A-400B provided herein for automating the selection of data inputs in feed-forward constrained hierarchical model, in accordance with some embodiments.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Figure 1B:
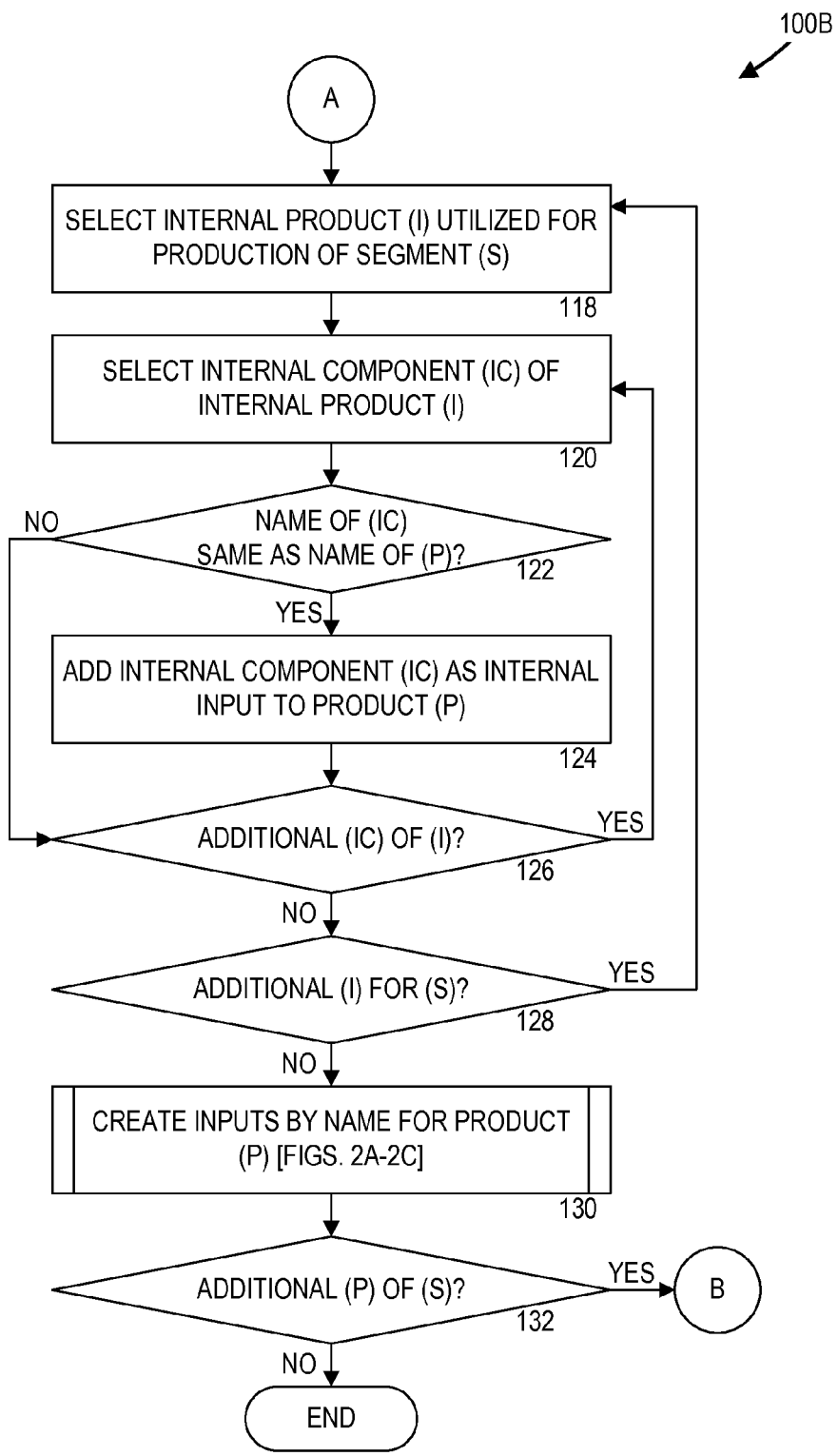

Referring now to FIGS. 1A-1B, the method 100A-100B for creating inputs by name for a segment is illustrated. In FIG. 1A, the method 100A-100B begins at operation 102, where a computational unit, such as an automation module 518 illustrated in FIG. 5, retrieves a segment (S) from the model 520. The segment (S) may contain one or more products (Ps) that are component parts of the segment (S). The segment (S) may define external inputs and/or internal inputs that are utilized or required for the production of the segment (S). The external inputs may include zero, one, or more external products (Es). The internal inputs may include zero, one, or more internal products (Is). Each external product (E) may include one or more external components (ECs). Each internal product (I) may include one or more internal components (ICs). Each product (P), each external component (EC), and each internal component (IC) may be associated with a name. Each product (P) may not define external inputs and/or internal inputs that are utilized or required for the production of the product (P). When the automation module 518 retrieves the segment (S) from the model 520, the method 100A-100B proceeds to operation 104.

At operation 104, the automation module 518 selects a product (P) that is a component part of the segment (S). The method 100A-100B then proceeds to operation 106, where the automation module 518 selects an external product (E) that is utilized or required for the production of the segment (S). The method 100A-100B then proceeds to operation 108, where the automation module 518 selects an external component (EC) of the selected external product (E). When the automation module 518 selects the external component (EC) of the external product (E), the method 100A-100B proceeds to operation 110.

At operation 110, the automation module 518 determines whether the name of the selected external component (EC) is the same as or otherwise matches the name of the selected product (P). If the name of the selected external component (EC) is the same as or otherwise matches the name of the selected product (P), then the method 100A-100B proceeds to operation 112, where the automation module 518 adds the selected external component (EC) as an external input to the selected product (P). When the automation module 518 adds the selected external component (EC) as an external input to the selected product (P), the method 100A-100B proceeds from operation 112 to operation 114. If the name of the selected external component (EC) does not match the name of the selected product (P), then the method 100A-100B proceeds from operation 110 to operation 114.

At operation 114, the automation module 518 determines whether an additional external component (EC) of the external product (E) has not yet been selected. If the automation module 518 determines that an additional external component (EC) of the external product (E) has not yet been selected, then the method 100A-100B proceeds back to operation 108. Operations 108-114 may be repeated until each external component (EC) of the external product (E) has been selected and evaluated. If the automation module 518 determines that each external component (EC) of the external product (E) has been selected, then the method 100A-100B proceeds to operation 116.

At operation 116, the automation module 518 determines whether an additional external product (E) utilized or required for the production of the segment (S) has not yet been selected. If the automation module 518 determines that an additional external product (E) utilized or required for the production of the segment (S) has not yet been selected, then the method 100A-100B proceeds back to operation 106. Operations 106-116 may be repeated until each external product (E) utilized or required for the production of the segment (S) has been selected and evaluated. If the automation module 518 determines that each external product (E) utilized or required for the production of the segment (S) has been selected, then the method 100A-100B proceeds to operation 118 in FIG. 1B.

At operation 118, the automation module 518 selects an internal product (I) that is utilized or required for the production of the segment (S). The method 100A-100B then proceeds to operation 120, where the automation module 518 selects an internal component (IC) of the selected internal product (I). When the automation module 518 selects the internal component (IC) of the selected internal product (I), the method 100A-100B proceeds to operation 122.

At operation 122, the automation module 518 determines whether the name of the selected internal component (IC) is the same as or otherwise matches the name of the selected product (P). If the name of the selected internal component (IC) is the same as or otherwise matches the name of the selected product (P), then the method 100A-100B proceeds to operation 124, where the automation module 518 adds the selected internal component (IC) as an internal input to the selected product (P). When the automation module 518 adds the selected internal component (IC) as an internal input to the selected product (P), the method 100A-100B proceeds from operation 124 to operation 126. If the name of the selected internal component (IC) does not match the name of the selected product (P), then the method 100A-100B proceeds from operation 122 to operation 126.

At operation 126, the automation module 518 determines whether an additional internal component (IC) of the internal product (I) has not yet been selected. If the automation module 518 determines that an additional internal component (IC) of the internal product (I) has not yet been selected, then the method 100A-100B proceeds back to operation 120. Operations 120-126 may be repeated until each internal component (IC) of the internal product (I) has been selected and evaluated. If the automation module 518 determines that each internal component (IC) of the internal product (I) has been selected, then the method 100A-100B proceeds to operation 128.

At operation 128, the automation module 518 determines whether an additional internal product (I) utilized or required for the production of the segment (S) has not yet been selected. If the automation module 518 determines that an additional internal product (I) utilized or required for the production of the segment (S) has not yet been selected, then the method 100A-100B proceeds back to operation 118. Operations 118-128 may be repeated until each internal product (I) utilized or required for the production of the segment (S) has been selected and evaluated. If the automation module 518 determines that each internal product (I) utilized or required for the production of the segment (S) has been selected, then the method 100A-100B proceeds to operation 130.

At operation 130, the automation module 518 creates inputs by name for the selected product (P). An illustrative process for creating inputs by name for the selected product (P) is described in greater detail below with reference to FIGS. 2A-2C. When the automation module 518 creates inputs by name for the selected product (P), the method 100A-100B proceeds to operation 132, where the automation module 518 determines whether an additional product (P) that is a component part of the segment (S) has not yet been selected. If the automation module 518 determines that an additional product (P) that is a component part of the segment (S) has not yet been selected, then the method 100A-100B proceeds back to operation 104 in FIG. 1A. Operations 104-132 may be repeated until each product (P) that is a component part of the segment (S) has been selected and evaluated. If the automation module 518 determines that each product (P) that is a component part of the segment (S) has been selected, then the method 100A-100B terminates.

Figure 2A:
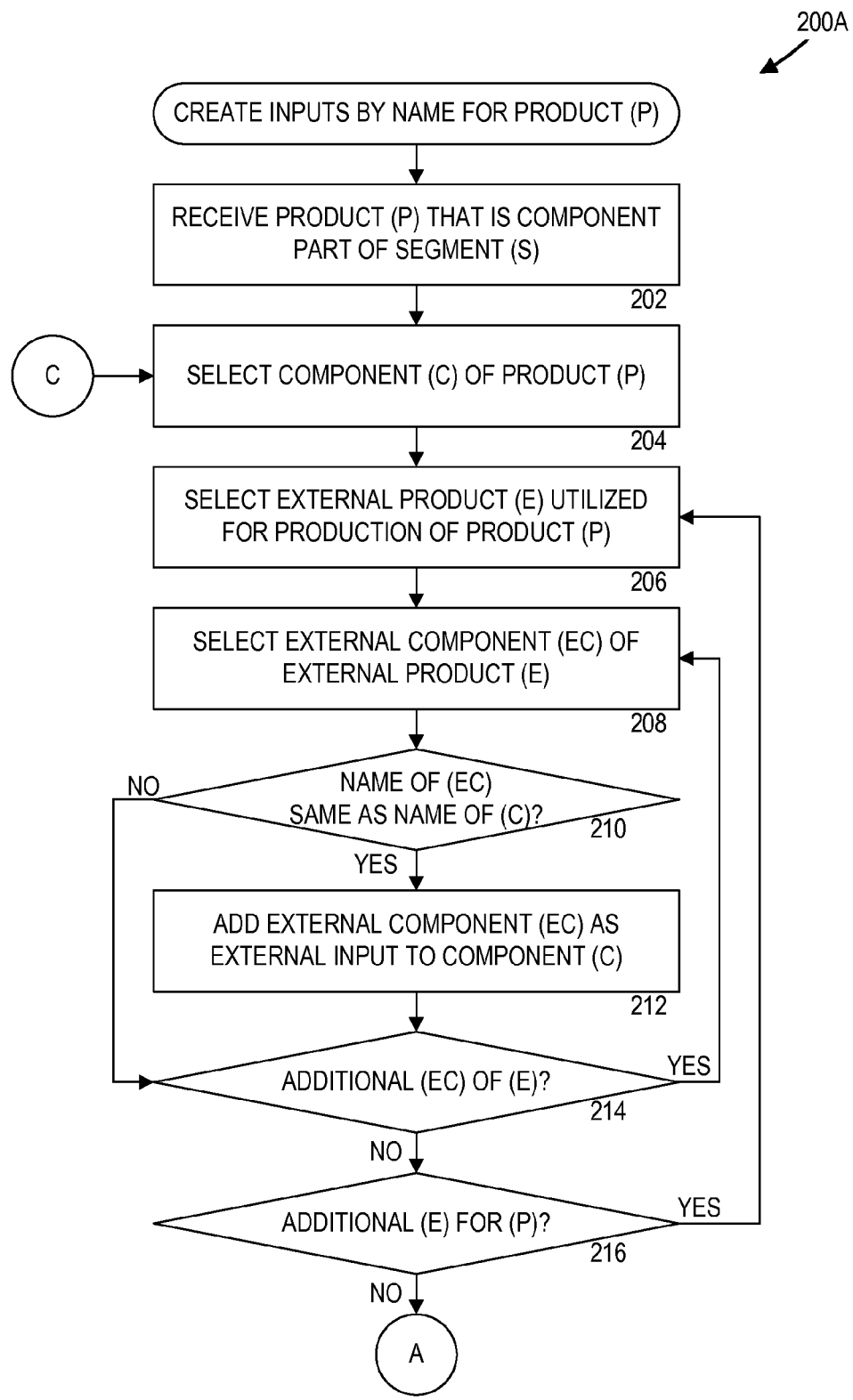
FIGS. 2A-2C are flow diagrams illustrating an example method for creating inputs by name for a product, in accordance with some embodiments.
Figure 2B:
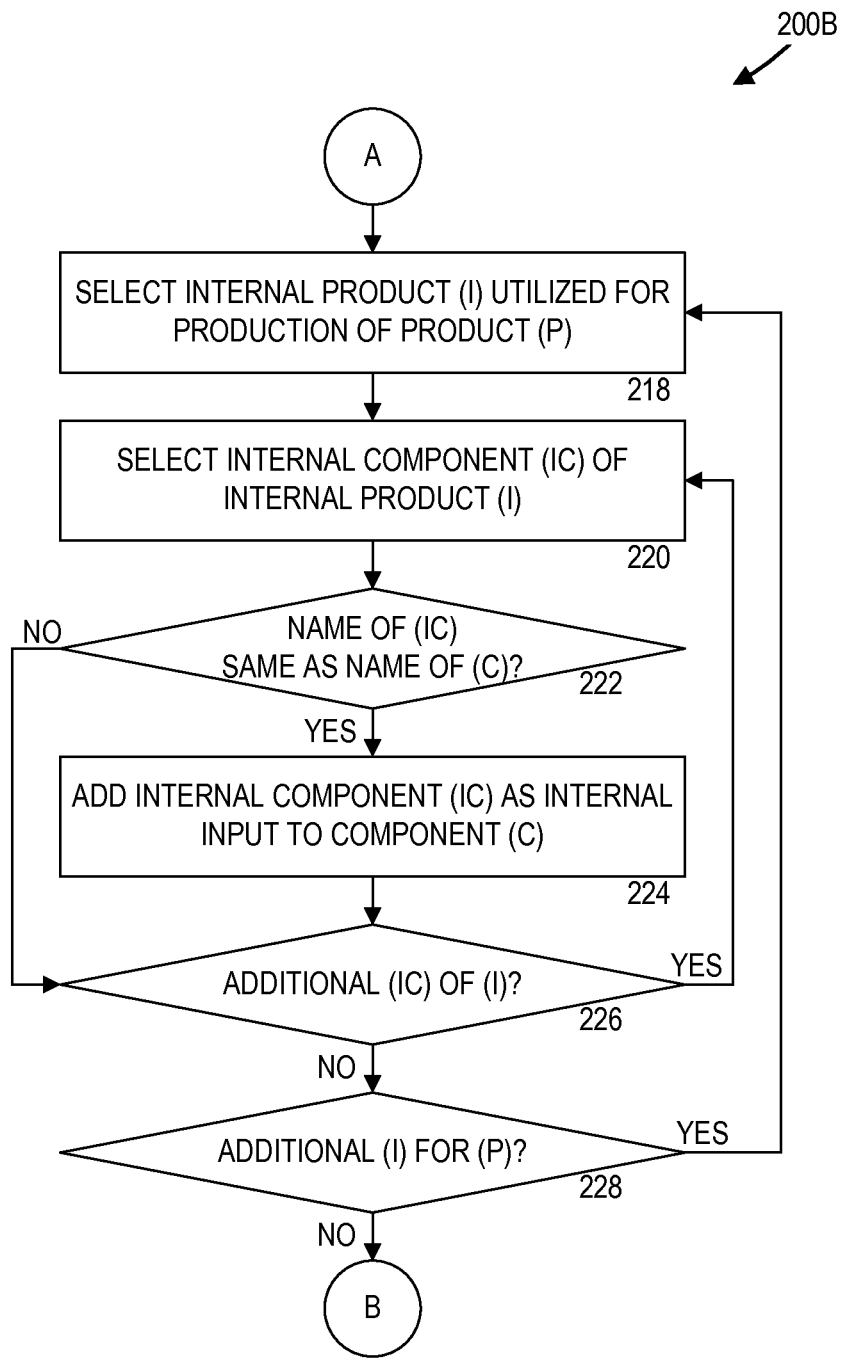
Figure 2C:
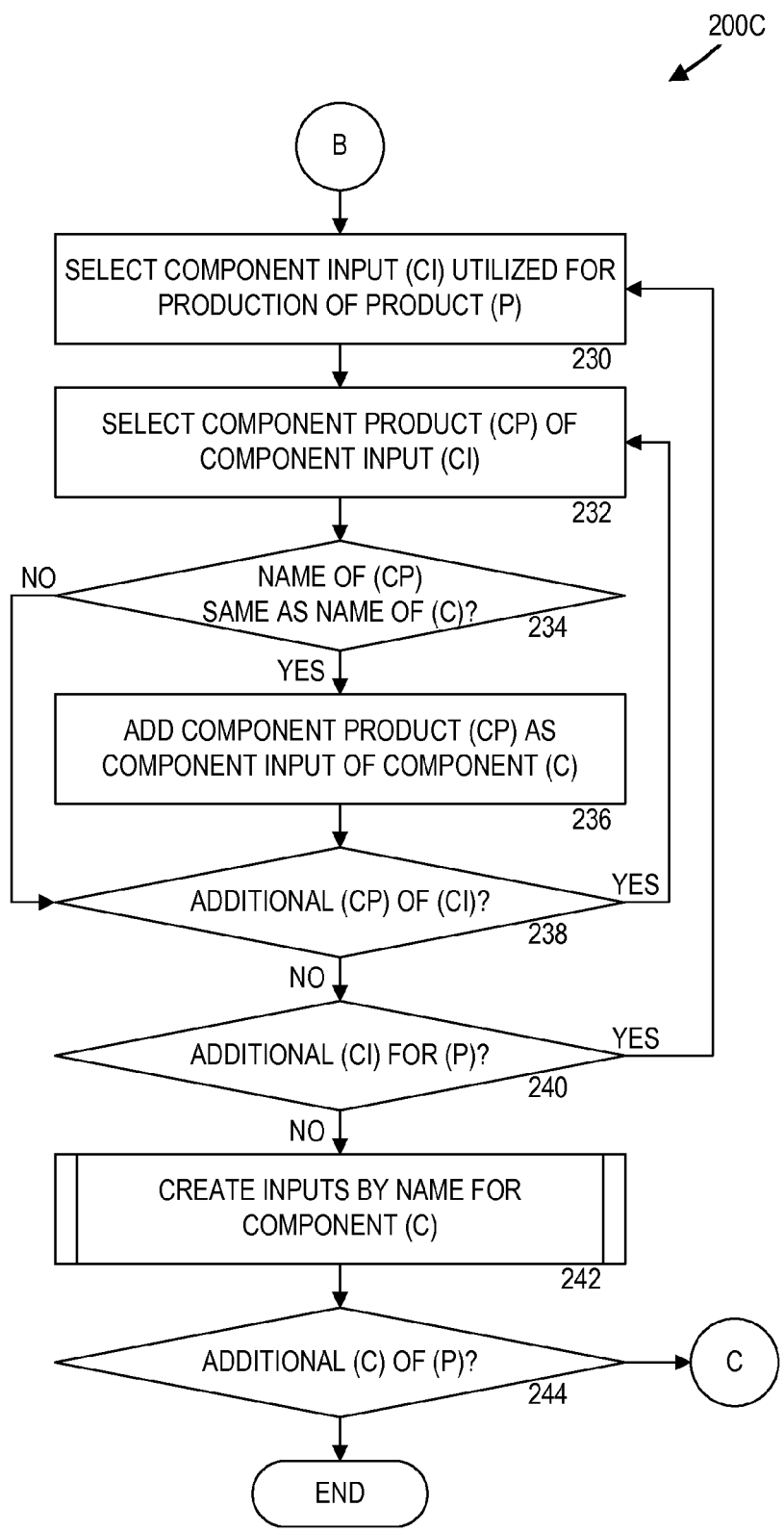

Referring now to FIGS. 2A-2C, the method 200A-200C for creating inputs by name for a product is illustrated. In FIG. 2A, the method 200A-200C begins at operation 202, where the automation module 518 receives the product (P) that is a component part of the segment (S) described in the method 100A-100B. The product (P) may contain one or more components (Cs) that are component parts of the product (P). The product (P) may define external inputs, internal inputs, and/or component inputs that utilized or required for the production of the product (P). The external inputs may include zero, one, or more external products (Es). The internal inputs may include zero, one, or more internal products (Is). The component inputs may include zero, one, or more component input (CIs). Each external product (E) may include one or more external components (ECs). Each internal product (I) may include one or more internal components (ICs). Each component input (CI) may include one or more component products (CPs).

Each component (C), each external component (EC), each internal component (IC), and each component input (CI) may be associated with a name. Each component (C) may not define external inputs, internal inputs, and/or component inputs received by the component (C) that are utilized or required for the production of the component (C). When the automation module 518 receives the product (P) that is a component part of the segment (S), the method 200A-200C proceeds to operation 204.

At operation 204, the automation module 518 selects a component (C) that is a component part of the product (P). The method 200A-200C then proceeds to operation 206, where the automation module 518 selects an external product (E) that is utilized or required for the production of the product (P). The method 200A-200C then proceeds to operation 208, where the automation module 518 selects an external component (EC) of the selected external product (E). When the automation module 518 selects the external component (EC) of the external product (E), the method 200A-200C proceeds to operation 210.

At operation 210, the automation module 518 determines whether the name of the selected external component (EC) is the same as or otherwise matches the name of the selected component (C). If the name of the selected external component (EC) is the same as or otherwise matches the name of the selected component (C), then the method 200A-200C proceeds to operation 212, where the automation module 518 adds the selected external component (EC) as an external input to the selected component (C). When the automation module 518 adds the selected external component (EC) as an external input to the selected component (C), the method 200A-200C proceeds from operation 212 to operation 214. If the name of the selected external component (EC) does not match the name of the selected component (C), then the method 200 proceeds from operation 210 to operation 214.

At operation 214, the automation module 518 determines whether an additional external component (EC) of the external product (E) has not yet been selected. If the automation module 518 determines that an additional external component (EC) of the external product (E) has not yet been selected, then the method 200A-200C proceeds back to operation 208. Operations 208-214 may be repeated until each external component (EC) of the external product (E) has been selected and evaluated. If the automation module 518 determines that each external component (EC) of the external product (E) has been selected, then the method 200A-200C proceeds to operation 216.

At operation 216, the automation module 518 determines whether an additional external product (E) utilized or required for the production of the product (P) has not yet been selected. If the automation module 518 determines that an additional external product (E) utilized or required for the production of the product (P) has not yet been selected, then the method 200A-200C proceeds back to operation 206. Operations 206-216 may be repeated until each external product (E) utilized or required for the production of the component (C) has been selected and evaluated. If the automation module 518 determines that each external product (E) utilized or required for the production of the component (C) has been selected, then the method 200A-200C proceeds to operation 218 in FIG. 2B.

At operation 218, the automation module 518 selects an internal product (I) that is utilized or required for the production of the selected component (C). The method 200A-200C then proceeds to operation 220, where the automation module 518 selects an internal component (IC) of the selected internal product (I). When the automation module 518 selects the internal component (IC) of the selected internal product (I), the method 200A-200C proceeds to operation 222.

At operation 222, the automation module 518 determines whether the name of the selected internal component (IC) is the same as or otherwise matches the name of the selected component (C). If the name of the selected internal component (IC) is the same as or otherwise matches the name of the selected component (C), then the method 200A-200C proceeds to operation 224, where the automation module 518 adds the selected internal component (IC) as an internal input to the selected component (C). When the automation module 518 adds the selected internal component (IC) as an internal input to the selected component (C), the method 200A-200C proceeds from operation 224 to operation 226. If the name of the selected internal component (IC) does not match the name of the selected component (C), then the method 200A-200C proceeds from operation 222 to operation 226

At operation 226, the automation module 518 determines whether an additional internal component (IC) of the internal product (I) has not yet been selected. If the automation module 518 determines that an additional internal component (IC) of the internal product (I) has not yet been selected, then the method 200A-200C proceeds back to operation 220. Operations 220-226 may be repeated until each internal component (IC) of the internal product (I) has been selected and evaluated. If the automation module 518 determines that each internal component (IC) of the internal product (I) has been selected, then the method 200A-200C proceeds to operation 228.

At operation 228, the automation module 518 determines whether an additional internal product (I) utilized or required for the production of the product (P) has not yet been selected. If the automation module 518 determines that an additional internal product (I) utilized or required for the production of the product (P) has not yet been selected, then the method 200A-200C proceeds back to operation 218. Operations 218-228 may be repeated until each internal product (I) utilized or required for the production of the product (P) has been selected and evaluated. If the automation module 518 determines that each internal product (I) utilized or required for the production of the product (P) has been selected, then the method 200A-200C proceeds to operation 230 in FIG. 2C.

At operation 230, the automation module 518 selects a component input (CI) that is utilized or required for the production of the product (P). The method 200A-200C then proceeds to operation 232, where the automation module 518 selects a component product (CP) of the selected component input (CI). When the automation module 518 selects the component product (CP) of the component input (CI), the method 200A-200C proceeds to operation 234.

At operation 234, the automation module 518 determines whether the name of the selected component product (CP) is the same as or otherwise matches the name of the selected component (C). If the name of the selected component product (CP) is the same as or otherwise matches the name of the selected component (C), then the method 200A-200C proceeds to operation 236, where the automation module 518 adds the selected component product (CP) as a component input to the selected component (C). When the automation module 518 adds the selected component product (CP) as an internal input to the selected component (C), the method 200A-200C proceeds from operation 236 to operation 238. If the name of the selected component product (CP) does not match the name of the selected component (C), then the method 200A-200C proceeds from operation 234 to operation 238.

At operation 238, the automation module 518 determines whether an additional component product (CP) of the component input (CI) has not yet been selected. If the automation module 518 determines that an additional component product (CP) of the component input (CO) has not yet been selected, then the method 200A-200C proceeds back to operation 232. Operations 232-238 may be repeated until each component product (CP) of the component input (CI) has been selected and evaluated. If the automation module 518 determines that each component product (CP) of the component input (CI) has been selected, then the method 200A-200C proceeds to operation 240.

At operation 240, the automation module 518 determines whether an additional component input (CI) utilized or required for the production of the product (P) has not yet been selected. If the automation module 518 determines that an additional component input (CI) utilized or required for the production of the product (P) has not yet been selected, then the method 200A-200C proceeds back to operation 230. Operations 230-240 may be repeated until each component product (CP) utilized or required for the production of the product (P) has been selected and evaluated. If the automation module 518 determines that each component product (CP) utilized or required for the production of the product (P) has been selected, then the method 200A-200C proceeds to operation 242.

At operation 242, the automation module 518 creates inputs by name for the selected component (C). The automation module 518 may create inputs by name for the selected component (C) by recursively repeating the same operations in the method 200A-200C for each additional lower level of component. When the automation module 518 creates inputs by name for the selected component (C) the method 200A-200C proceeds to operation 244, where the automation module 518 determines whether an additional component (C) that is a component part of the product (P) has not yet been selected. If the automation module 518 determines that an additional component (C) that is a component part of the product (P) has not yet been selected, then the method 200A-200C proceeds back to operation 204. Operations 204-244 may be repeated until each component (C) that is a component part of the product (P) has been selected and evaluated. If the automation module 518 determines that each component (C) that is a component part of the product (P) has been selected, then the method 200A-200C terminates.

Figure 3A:
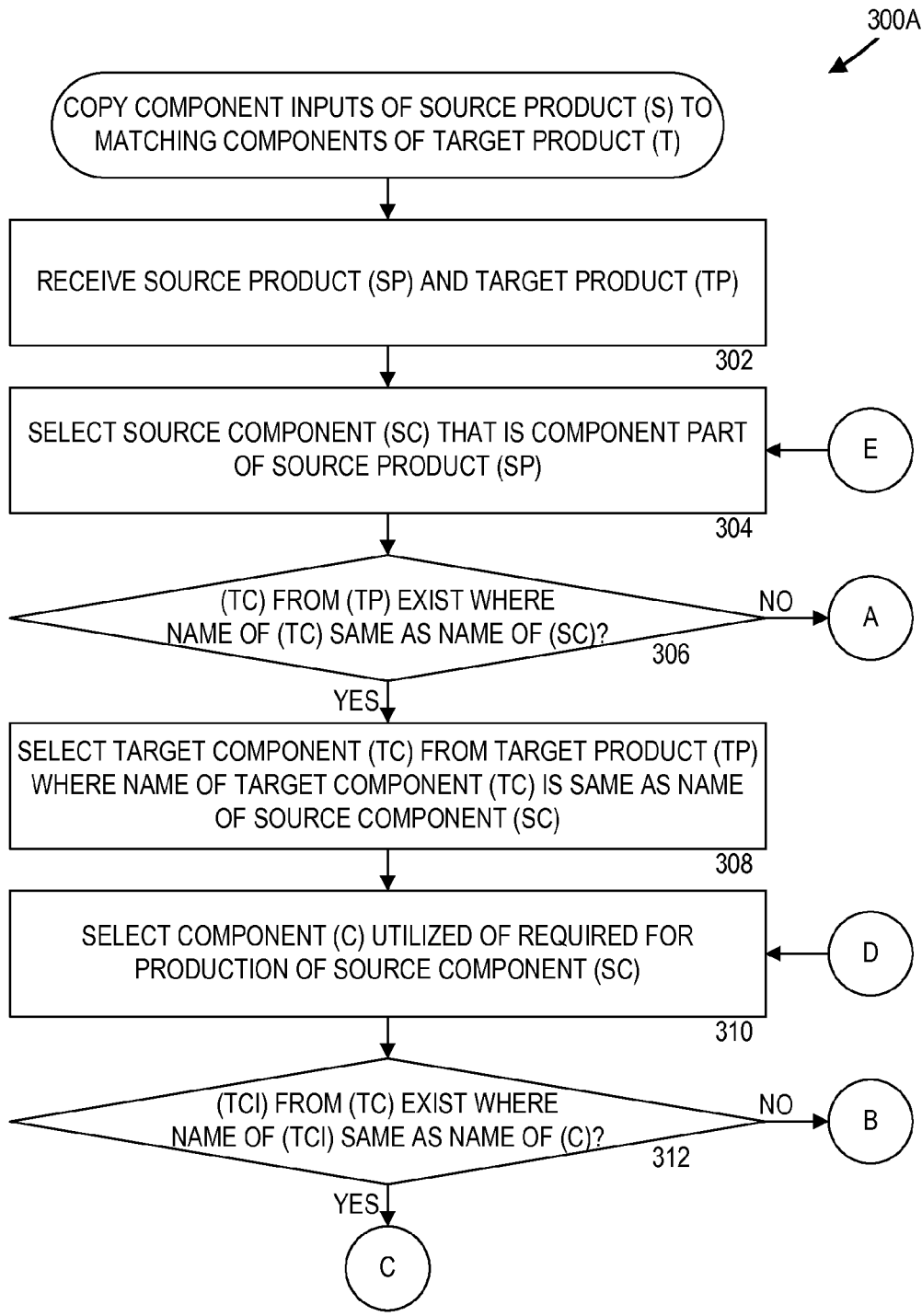
FIGS. 3A-3B are flow diagrams illustrating an example method for copying component inputs of a source product to matching components in a target product according to internal component relationships, in accordance with some embodiments.
Figure 3B:
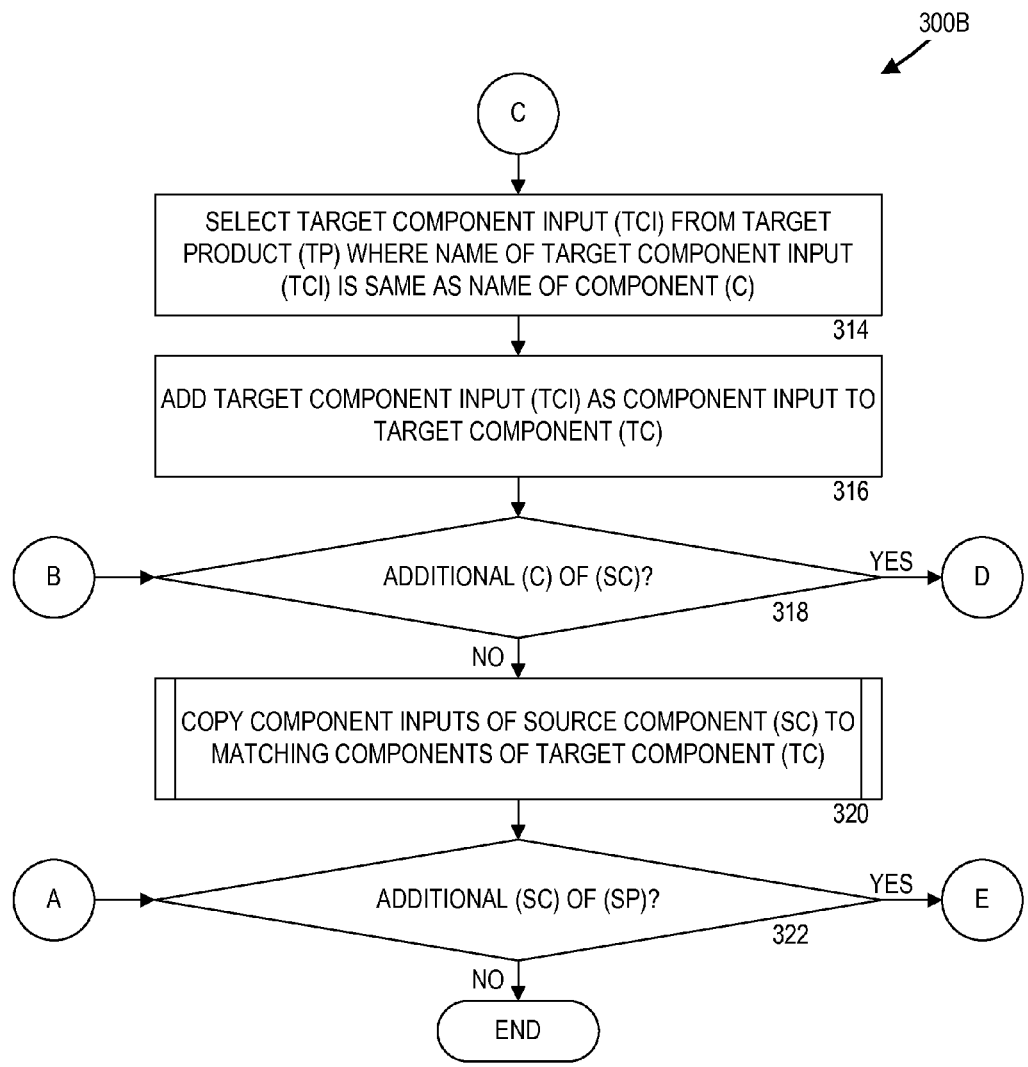

Referring now to FIGS. 3A-3B, the method 300A-300B for copying component inputs of a source product to matching components in a target product according to internal component relationships. In FIG. 3A, the method 300A-300B begins at operation 302, where the automation module 518 receives a source product (SP) and a target product (TP). The source product (SP) may contain one or more source components (SCs) that are component parts of the source product (SP). Each source component (SC) may define zero, one, or more components (Cs) that are utilized or required for the production of the source component (SC). The target product (TP) may include multiple target components (TCs). Each target component (TC) may include multiple target components inputs (TCIs) from which component inputs to the target component (TC) can be selected. Each target component (TC), each source component (SC), each target component input (TCI), and each component (C) may be associated with a name. When the automation module 518 receives the source product (SP) and the target product (TP), the method 300A-300B proceeds to operation 304.

At operation 304, the automation module 518 selects a source component (SC) from the source product (SP). The method 300A-300B then proceeds to operation 306, where the automation module 518 determines whether a target component (TC) from the component parts of the target product (TP) exists where the target component (TC) has the same name as the selected source component (SC). If the automation module 518 determines that a target component (TC) having the same name as the selected source component (SC) does not exist, then the method 300A-300B proceeds to operation 322 of FIG. 3B, which is described below. If the automation module 518 determines that a target component (TC) having the same name as the selected source component (SC) exists, then the method 300A-300B proceeds to operation 308.

At operation 308, the automation module 518 selects the target component (TC) having the same name as the selected source component (SC). The method 300A-300B then proceeds to operation 310, where the automation module 518 selects a component (C) that is utilized or required for the production of the source component (SC). The method 300A-300B then proceeds to operation 312, where the automation module 518 determines whether a target component input (TCI) from the component parts of the selected target component (TC) exists where the name of the target component input (TCI) is the same as or otherwise matches the name of the selected component (C). If the automation module 518 determines that a target component input (TCI) having the same name as the selected component (C) does not exist, then the method 300A-300B proceeds to operation 318 of FIG. 3B, which is described below. If the automation module 518 determines that a target component input (TCI) having the same name as the selected component (C) exists, then the method 300A-300B proceeds to operation 314 of FIG. 3B.

At operation 314, the automation module 518 selects the target component input (TCI) having the same name as the component (C). The method 300A-300B then proceeds to operation 316, where the automation module 518 adds the selected target component input (TCI) as a component input to the selected target component (TC). The method 300A-300B then proceeds to operation 318, where the automation module 518 determines whether an additional component (C) of the selected source component (SC) has not yet been selected. If the automation module 518 determines that an additional component (C) of the selected source component (SC) has not yet been selected, then the method 300A-300B proceeds back to operation 310 of FIG. 3A. Operations 310-318 may be repeated until each component (C) of the selected source component (SC) has been selected and evaluated. If the automation module 518 determines that each component (C) of the selected source component (SC) has been selected, then the method 300A-300B proceeds to operation 320.

At operation 320, the automation module 518 copies component inputs of the selected source component (SC) to matching components of the selected target component (TC). The automation module 518 may copy the component inputs of the selected source component (SC) to matching components of the selected target component (TC) by recursively repeating the same operations in the method 300A-300B for each additional lower level of component. When the automation module 518 copies component inputs of the selected source component (SC) to matching components of the selected target component (TC), the method 300A-300B proceeds to operation 322, where the automation module 518 determines whether an additional source component (SC) of the source product (SP) has not yet been selected. If the automation module 518 determines that an additional source component (SC) of the source product (SP) has not yet been selected, then the method 300A-300B proceeds back to operation 304. Operations 304-322 may be repeated until each source component (SC) of the source product (SP) has been selected and evaluated. If the automation module 518 determines that each source component (SC) of the source product (SP) has been selected, then the method 300A-300B terminates.

Figure 4A:
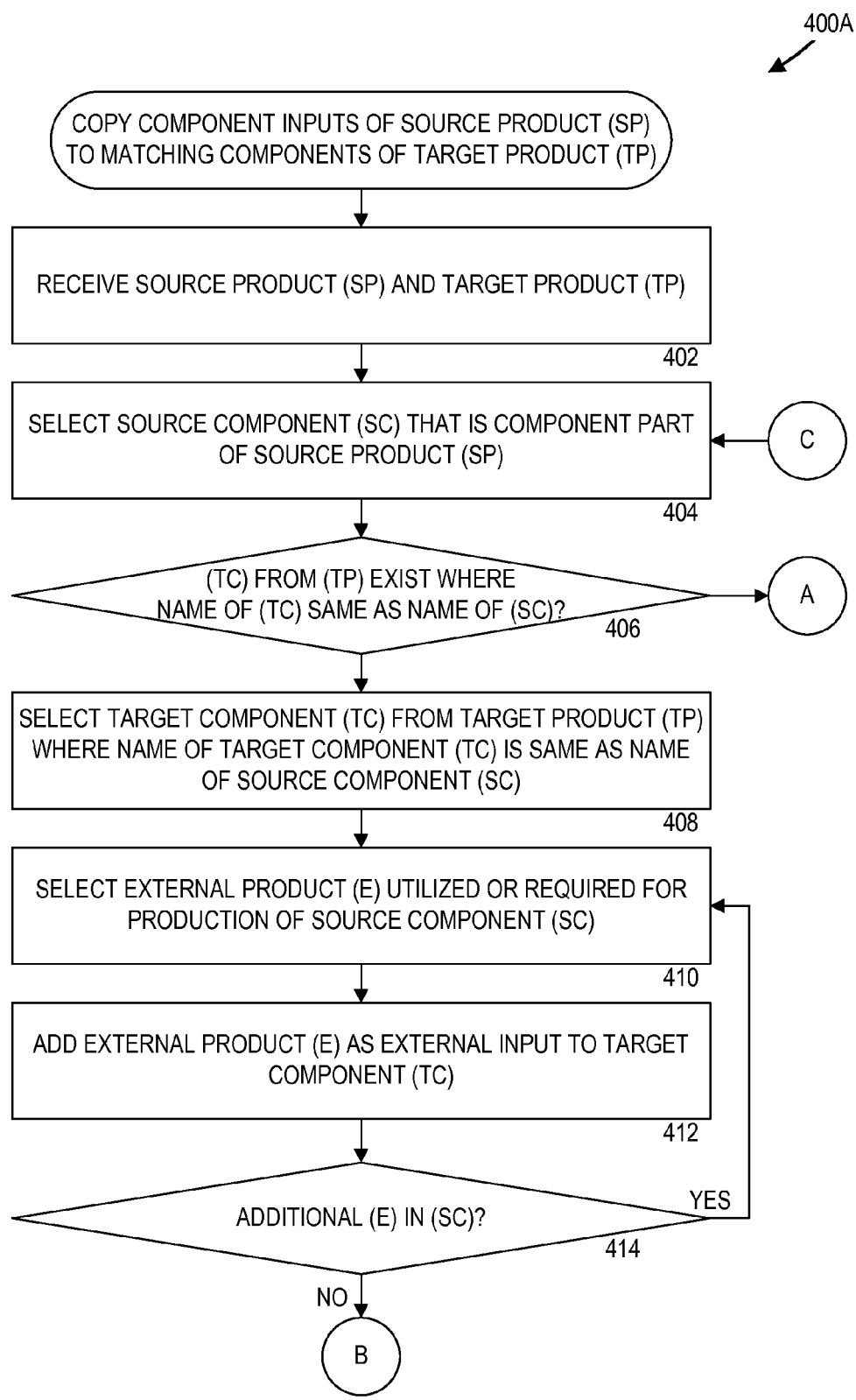
FIGS. 4A-4B are flow diagrams illustrating an example method for copying component inputs of a source product to matching components in a target product according to component input relationships, in accordance with some embodiments.
Figure 4B:
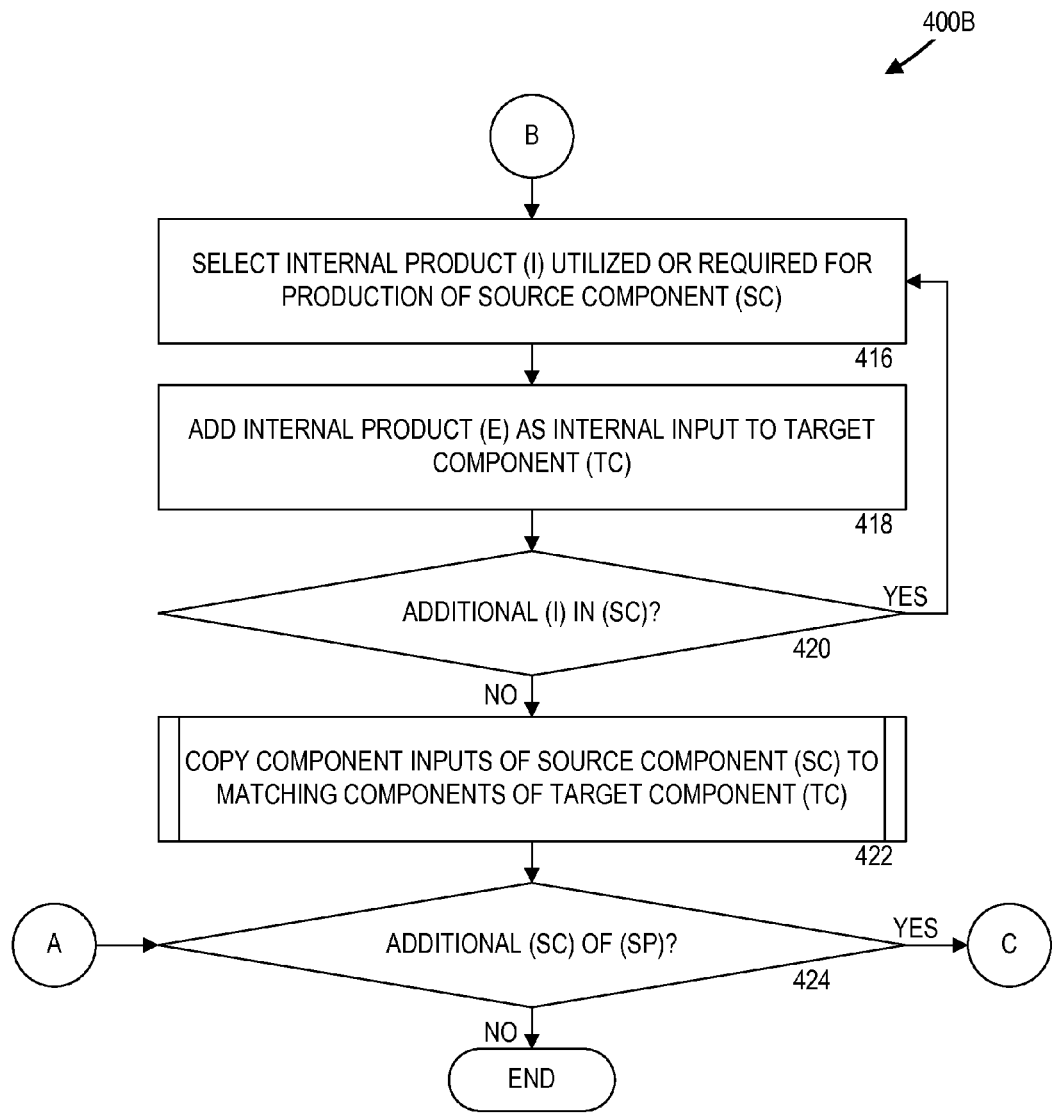

Referring now to FIGS. 4A-4B, the method 400A-400B for copying component inputs of a source product to matching components in a target product according to component input relationships. In FIG. 4A, the method 400A-400B begins at operation 402, where the automation module 518 receives a source product (SP) and a target product (TP). The source product (SP) may contain one or more source components (SCs) that are component parts of the source product (SP). Each source component (SC) may define zero, one, or more external products (Es) and zero, one, or more internal products (Is) that are utilized or required for the production of the source component (SC). The target product (TP) may include multiple target components (TCs). Each target component (TC) may not define external inputs and/or internal inputs that are utilized or required for the production of the target component (TC). Each target component (TC) and each source component (SC) may be associated with a name. When the automation module 518 receives the source product (SP) and the target product (TP), the method 400A-400B proceeds to operation 404.

At operation 404, the automation module 518 selects a source component (SC) from the source product (SP). The method 400A-400B then proceeds to operation 406, where the automation module 518 determines whether a target component from the component parts of the target product (TP) exists where the target component (TC) has the same name as the selected source component (SC). If the automation module 518 determines that a target component (TC) having the same name as the selected source component (SC) does not exist, then the method 400A-400B proceeds to operation 424 of FIG. 4B, which is described below. If the automation module 518 determines that a target component (TC) having the same name as the selected source component (SC) exists, then the method 400A-400B proceeds to operation 408.

At operation 408, the automation module 518 selects the target component (TC) having the same name as the selected source component (SC). The method 400A-400B then proceeds to operation 410, where the automation module 518 selects an external product (E) that is utilized or required for the production of the source component (SC). The method 400A-400B then proceeds to operation 412, where the automation module 518 adds the selected external product (E) as an external input to the selected target component (TC). The method 400A-400B then proceeds to operation 414, where the automation module 518 determines whether an additional external product (E) that is utilized or required for the production of the source component (SC) has not yet been selected. If the automation module 518 determines that an additional external product (E) that is utilized or required for the production of the source component (SC) has not yet been selected, then the method 400A-400B proceeds back to operation 410. Operations 410-414 may be repeated until each external product (E) that is utilized or required for the production of the source component (SC) has been selected and evaluated. If the automation module 518 determines that each external product (E) that is utilized or required for the production of the source component (SC) has been selected, then the method 400A-400B proceeds to operation 416 in FIG. 4B.

At operation 416, the automation module 518 selects an internal product (I) that is utilized or required for the production of the source component (SC). The method 400A-400B then proceeds to operation 418, where the automation module 518 adds the selected internal product (I) as an internal input to the selected target component (TC). The method 400A-400B then proceeds to operation 420, where the automation module 518 determines whether an additional internal product (I) that is utilized or required for the production of the source component (SC) has not yet been selected. If the automation module 518 determines that an additional internal product (I) that is utilized or required for the production of the source component (SC) has not yet been selected, then the method 400A-400B proceeds back to operation 416. Operations 416-420 may be repeated until each internal product (I) that is utilized or required for the production of the source component (SC) has been selected and evaluated. If the automation module 518 determines that each internal product (I) that is utilized or required for the production of the source component (SC) has been selected, then the method 400A-400B proceeds to operation 422.

At operation 422, the automation module 518 copies component inputs of the selected source component (SC) to matching components of the selected target component (TC). The automation module 518 may copy the component inputs of the selected source component (SC) to matching components of the selected target component (TC) by recursively repeating the same operations in the method 400A-400C for each additional lower level of component. When the automation module 518 copies component inputs of the selected source component (SC) to matching components of the selected target component (TC), the method 400A-400B proceeds to operation 424, where the automation module 518 determines whether an additional source component (SC) of the source product (SP) has not yet been selected. If the automation module 518 determines that an additional source component (SC) of the source product (SP) has not yet been selected, then the method 400A-400B proceeds back to operation 404. Operations 404-424 may be repeated until each source component (SC) of the source product (SP) has been selected and evaluated. If the automation module 518 determines that each source component (SC) of the source product (SP) has been selected, then the method 400A-400B terminates.

Figure 5:
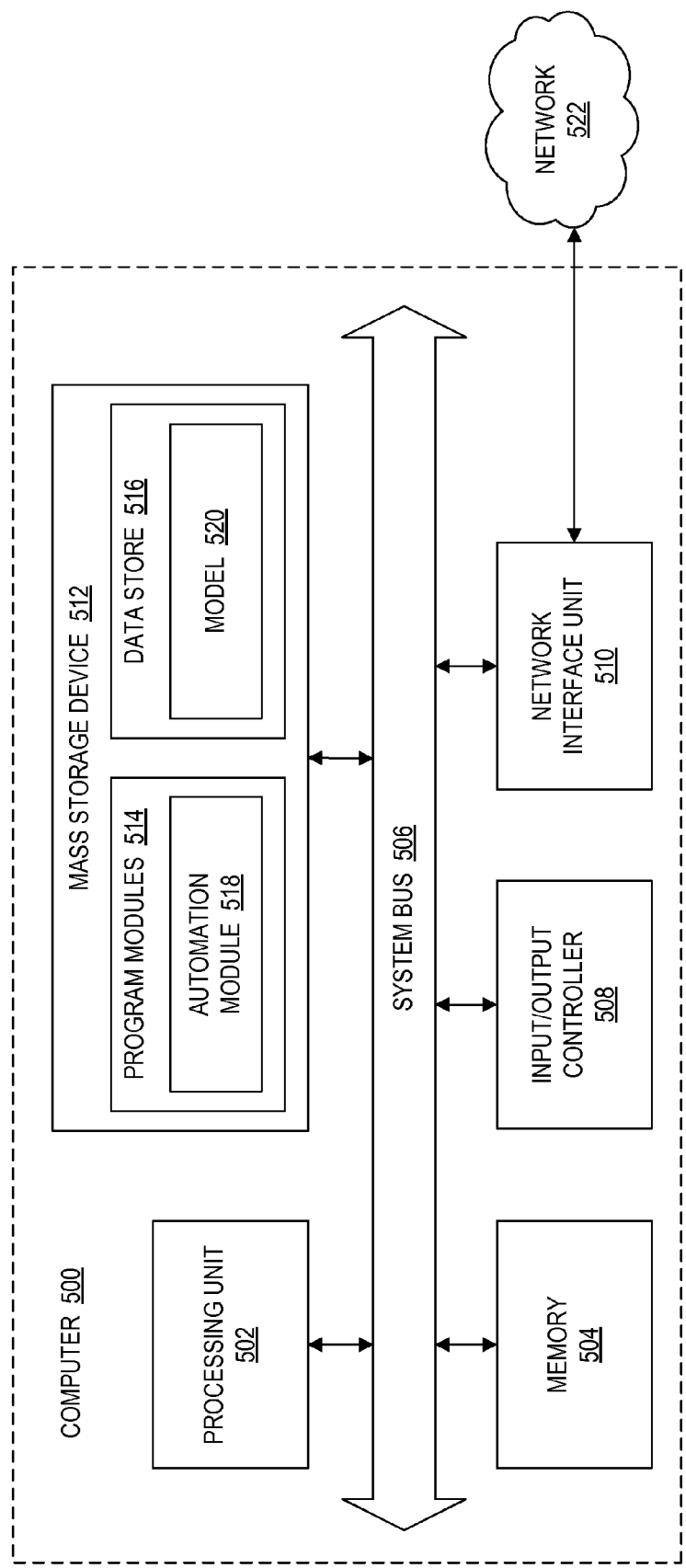
FIG. 5 is a computer architecture diagram showing aspects of an illustrative computer hardware architecture for a computing system capable of implementing aspects of the embodiments presented herein.

Referring now to FIG. 5, an example computer architecture diagram showing a computer 500 is illustrated. The computer 500 may include a central processing unit 502, a system memory 504, and a system bus 506 that couples the memory 504 to the 502. The computer 500 may further include a mass storage device 512 for storing one or more program modules 514 and a data store 516. An example of the program modules 514 may include the automation module 518. The data store 516 may store the model 520 and/or other relevant data. The mass storage device 512 may be connected to the processing unit 502 through a mass storage controller (not shown) connected to the bus 506. The mass storage device 512 and its associated computer-storage media may provide non-volatile storage for the computer 500. Although the description of computer-storage media contained herein refers to a mass storage device, such as a hard disk or CD-ROM drive, it should be appreciated by those skilled in the art that computer-storage media can be any available computer storage media that can be accessed by the computer 500.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network such as a network 522. The computer 500 may connect to the network 522 through a network interface unit 510 connected to the bus 506. It should be appreciated that the network interface unit 510 may also be utilized to connect to other types of networks and remote computer systems. The computer 500 may also include an input/output controller 508 for receiving and processing input from a number of input devices (not shown), including a keyboard, a mouse, a microphone, and a game controller. Similarly, the input/output controller 508 may provide output to a display or other type of output device (not shown).

The bus 506 may enable the processing unit 502 to read code and/or data to/from the mass storage device 512 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 514 may include software instructions that, when loaded into the processing unit 502 and executed, cause the computer 500 to automate a selection of data inputs for constructing a scalable feed forward processes. The program modules 514 may also provide various tools or techniques by which the computer 500 may participate within the overall systems or operating environments using the components, flows, and data structures discussed throughout this description. For example, the program modules 514 may implement interfaces for automating a selection of data inputs for constructing a scalable feed forward processes.

In general, the program modules 514 may, when loaded into the processing unit 502 and executed, transform the processing unit 502 and the overall computer 500 from a general-purpose computing system into a special-purpose computing system customized to automate a selection of data inputs for constructing a scalable feed forward processes. The processing unit 502 may be constructed from any number of transistors or other discrete circuit elements, which may individually or collectively assume any number of states. More specifically, the processing unit 502 may operate as a finite-state machine, in response to executable instructions contained within the program modules 514. These computer-executable instructions may transform the processing unit 502 by specifying how the processing unit 502 transitions between states, thereby transforming the transistors or other discrete hardware elements constituting the processing unit 502.

Encoding the program modules 514 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 514 may transform the physical state of the semiconductor memory, when the software is encoded therein. For example, the program modules 514 may transform the state of transistors, capacitors, or other discrete circuit elements constituting the semiconductor memory.

As another example, the computer-storage media may be implemented using magnetic or optical technology. In such implementations, the program modules 514 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for automating a selection of data inputs for constructing a scalable feed forward processes are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for automating a selection of data inputs, the method comprising computer-implemented operations for:
   (a) receiving a selection of a segment, the segment comprising a highest level of a product hierarchy;
   (b) receiving a selection of a product that comprises a component of the segment, wherein inputs utilized to produce the component are currently unknown;
   (c) receiving a selection of an external product that is utilized for production of the product;
   (d) receiving a selection of an external component of the external product;
   (e) determining whether a name of the external component matches a name of the component;
   (f) in response to determining that the name of the external component matches the name of the component, adding the external component as an external input to the component thereby indicating that the external component is utilized to produce the component;
   (g) receiving a selection of an internal product that is utilized for the production of the segment;
   (h) receiving a selection of an internal component of the internal product;
   (i) determining whether a name of the internal component matches the name of the product; and
   (j) in response to determining that the name of the internal component matches the name of the product, adding the internal component as an internal input to the product, wherein the segment, product, and external component are defined within a computer generated process model, wherein the method alters the process model to maintain a feed-forward constraint such that no cycles or loops are contained within the process model.

2. The computer-implemented method of claim 1, further comprising computer-implemented operations for repeating operations (d)-(f) until each external component in a plurality of external components of the external product has been selected and evaluated.

3. The computer-implemented method of claim 2, further comprising computer-implemented operations for repeating operations (c)-(f) until each external product in a plurality of external products that are utilized for the production of the segment has been selected and evaluated.

4. The computer-implemented method of claim 3, further comprising computer-implemented operations for repeating operations (h)-(j) until each internal component in a plurality of internal components of the internal product has been selected and evaluated.

5. The computer-implemented method of claim 4, further comprising computer-implemented operations for repeating operations (g)-(j) until each internal product in a plurality of internal products that are utilized for the production of the segment has been selected and evaluated.

6. The computer-implemented method of claim 5, further comprising computer-implemented operations for repeating operations (a)-(j) until each product in a plurality of products that are component parts of the segment has been selected and evaluated.

7. The computer-implemented method of claim 1, further comprising computer-implemented operations for:

(k) receiving a selection of the component;
(l) receiving a selection of a second external product utilized for production of the product;
(m) receiving a selection of a second external component of the second external product;
(n) determining whether a name of the second external component matches the name of the component;
(o) in response to determining that the name of the second external component matches the name of the component, adding the second external component as another external input to the component;
(p) receiving a selection of a second internal product utilized for the production of the product;
(q) receiving a selection of a second internal component of the second internal product;
(r) determining whether a name of the second internal component matches the name of the component;
(s) in response to determining that the name of the second internal component matches the name of the component, adding the second internal component as an internal input to the component;
(t) receiving a selection of a component input utilized for the production of the product;
(u) receiving a selection of a component product of the component input;
(v) determining whether a name of the component product matches the name of the component; and
(w) in response to determining that the name of the component product matches the name of the component, adding the component product as a component input to the component.

8. The computer-implemented method of claim 7, further comprising computer-implemented operations for repeating operations (m)-(o) until each second external component in a plurality of second external components of the second external product has been selected and evaluated.

9. The computer-implemented method of claim 8, further comprising computer-implemented operations for repeating operations (l)-(o) until each second external product in a plurality of second external products that are utilized for the production of the product has been selected and evaluated.

10. The computer-implemented method of claim 9, further comprising computer-implemented operations for repeating operations (q)-(s) until each second internal component in a plurality of second internal components of the second internal product has been selected and evaluated.

11. The computer-implemented method of claim 10, further comprising computer-implemented operations for repeating operations (o)-(s) until each second internal product in a plurality of second internal products that are utilized for the production of the product has been selected and evaluated.

12. The computer-implemented method of claim 11, further comprising computer-implemented operations for repeating operations (u)-(w) until each component product in a plurality of component products of the component input has been selected and evaluated.

13. The computer-implemented method of claim 12, further comprising computer-implemented operations for repeating operations (t)-(w) until each component input in a plurality of component inputs that are utilized for the production of the product has been selected and evaluated.

14. The computer-implemented method of claim 13, further comprising computer-implemented operations for recursively repeating operations (l)-(w) to create inputs for the component.

15. The computer-implemented method of claim 14, further comprising computer-implemented operations for repeating operations (k)-(w) until each component in a plurality of components that are component parts of the product has been selected and evaluated.

16. A system for automating a selection of data inputs, the system comprising:
a processor;
a memory coupled to the processor; and
a program module which executes in the processor from the memory and which, when executed by the processor, causes the system to automate the selection of data inputs by
(a) receiving a source product and a target product, wherein inputs of the source product are known and the inputs of the target product are unknown;
(b) receiving a selection of a source component that is a component part of the source product;
(c) determining whether a target component from the target product exists where a name of the target component matches a name of the source component;
(d) in response to determining that the target component from the target product exists where the name of the target component matches the name of the source component, assigning an input for the target component based on an input to the source component;
(e) receiving a selection of an internal product utilized for production of the source component; and
(f) automatically adding the internal product as an internal input to the target component, wherein the source product and the target product are defined within a computer generated process model, wherein the system alters the process model to maintain a feed-forward constraint such that no cycles or loops are contained within the process model.

17. The system of claim 16, wherein the program module, when executed by the processor, further causes the system to automate the selection of data inputs by repeating operations (e)-(f) until each internal product in the source component has been selected and evaluated.

18. The system of claim 16, wherein the program module, when executed by the processor, further causes the system to automate the selection of data inputs by repeating operations (b)-(d) until each source component in a plurality of source components that are component parts of the source product has been selected and evaluated.

19. A non-transitory computer-readable storage medium having computer-executable instructions stored thereon which, when executed by a computer, cause the computer to automate a selection of data inputs by:
(a) receiving a source product and a target product, wherein inputs of the source product are known and the inputs of the target product are unknown;
(b) receiving a selection of a source component that is a component part of the source product;
(c) determining whether a target component from the target product exists where a name of the target component matches a name of the source component;
(d) in response to determining that the target component from the target product exists where the name of the target component matches the name of the source component, identifying an external product utilized for production of the source component;

(e) after identifying the external product utilized for production of the source component, adding the external product as an external input to the target component;

(f) repeating operations (d)-(e) until each external product utilized for production of the source component has been selected and evaluated;

(g) in response to determining the name of the target component matches the name of the source component, receiving a selection of an internal product utilized for production of the source component;

(h) upon selecting the internal product utilized for production of the source component, adding the internal product utilized for production of the source component as an input to the target component;

(i) repeating operations (g)-(h) until each internal product utilized for production of the source component has been selected and evaluated;

(j) recursively repeating operations (d)-(i) to copy component inputs from the source component to matching components of the target component; and (k) repeating operations (b)-(j) until each source component in a plurality of source components that are component parts of the source product has been selected and evaluated, automatically adding the internal product as an internal input to the target component, wherein the source product and the target product are defined within a computer generated process model, wherein the computer alters the process model to maintain a feed-forward constraint such that no cycles or loops are contained within the process model.

* * * * *